(12) United States Patent
Tyercha et al.

(10) Patent No.: US 9,477,745 B2
(45) Date of Patent: Oct. 25, 2016

(54) PREDICTIVE CLUSTER ANALYTICS OPTIMIZATION

(71) Applicants: Edward-Robert Tyercha, Heidelberg (DE); Gerrit Simon Kazmaier, Heidelberg (DE); Hinnerk Gildhoff, Heidelberg (DE); Isil Pekel, Heidelberg (DE); Lars Volker, Karlsruhe (DE); Tim Grouisborn, Mannheim (DE)

(72) Inventors: Edward-Robert Tyercha, Heidelberg (DE); Gerrit Simon Kazmaier, Heidelberg (DE); Hinnerk Gildhoff, Heidelberg (DE); Isil Pekel, Heidelberg (DE); Lars Volker, Karlsruhe (DE); Tim Grouisborn, Mannheim (DE)

(73) Assignee: SAP SE, Walldorf (DE)

( * ) Notice: Subject to any disclaimer, the term of this patent is extended or adjusted under 35 U.S.C. 154(b) by 290 days.

(21) Appl. No.: 14/325,233

(22) Filed: Jul. 7, 2014

(65) Prior Publication Data
US 2016/0004765 A1 Jan. 7, 2016

(51) Int. Cl.
*G06F 7/00* (2006.01)
*G06F 17/30* (2006.01)

(52) U.S. Cl.
CPC ... *G06F 17/30601* (2013.01); *G06F 17/30312* (2013.01); *G06F 17/30321* (2013.01); *G06F 17/30539* (2013.01); *G06F 17/30946* (2013.01)

(58) Field of Classification Search
None
See application file for complete search history.

(56) References Cited

U.S. PATENT DOCUMENTS

| | | | | |
|---|---|---|---|---|
| 6,460,026 | B1* | 10/2002 | Pasumansky | G06F 17/30592 707/737 |
| 7,177,452 | B2* | 2/2007 | Wong | G06F 19/26 382/128 |
| 8,219,564 | B1* | 7/2012 | Shao | G06F 17/30946 707/743 |
| 2006/0083429 | A1* | 4/2006 | Joly | G06F 17/3028 382/228 |
| 2009/0240755 | A1* | 9/2009 | Rakib | G06T 17/30 708/401 |
| 2012/0036163 | A1* | 2/2012 | Myers | G06F 17/30321 707/797 |
| 2013/0015351 | A1* | 1/2013 | Kooijman | G01N 23/2206 250/307 |
| 2014/0095502 | A1* | 4/2014 | Ziauddin | G06F 17/30289 707/737 |
| 2016/0004762 | A1* | 1/2016 | Tyercha | G06F 17/30315 707/737 |

OTHER PUBLICATIONS

Halkich et al., "A Data Set Oriented Approach for Clustering Algorithm Selection", Principles of Data Mining and Knowledge Discovery, vol. 2168 of the series Lecture Notes in Computer Science, pp. 165-179, 2001, Springer Berlin Heidelberg.*
Vega-Pons et al., "A Survey of Clustering Ensemble Algorithms", International Journal of Pattern Recognition and Artificial Intelligence, vol. 25, No. 3, pp. 337-372, 2011, World Scientific Publishing Company.*
Ferreira et al., "Kernel fuzzy clustering methods based on local adaptive distances", 2012 IEEE International Conference on Fuzzy Systems (FUZZ-IEEE), pp. 1-8, 2012, IEEE.*
Unnikraishnan et al., "Development of Hierarchical Clustering Techniques for Gridded Data from Mixed Data Sequences", Thesis, Department of Computer Science, Cochin University of Science and Technology, 2013.*

* cited by examiner

*Primary Examiner* — Michael Hicks
(74) *Attorney, Agent, or Firm* — Mintz Levin Cohn Ferris Glovsky and Popeo, P.C.

(57) ABSTRACT

Cluster analysis of data points in a data set can be optimized by identification of a preferred cluster analysis method. This identification can be based on indexing the data using a Hilbert curve and determining whether the data points are predominantly in spherical or non-spherical clusters. Methods, systems, and articles of manufacture are described.

16 Claims, 8 Drawing Sheets

200

PREDICTIVE CLUSTER ANALYTICS OPTIMIZATION

TECHNICAL FIELD

The subject matter described herein relates to cluster analysis of data.

BACKGROUND

Cluster analysis or clustering is the task of grouping a set of data in such a way that data points in the same cluster (e.g. a group of data points) are more similar (in some sense or another) to each other than to those in other clusters. Cluster analysis is frequently employed in exploratory data mining, statistical data analysis, etc., and is useful in many fields.

Various algorithms that differ significantly in regards to what is considered to be a cluster and how such clusters are discovered can be used in cluster analysis. Typical approaches to clustering include groups with small distances among the cluster members, dense areas of the data space, intervals or particular statistical distributions. Cluster analysis is therefore something of a multi-objective optimization problem. The appropriate clustering algorithm and parameter settings (including values such as the distance function to use, a density threshold or the number of expected clusters) depend on the individual data set and intended use of the results. Cluster analysis as such is not an automatic task, but an iterative process of knowledge discovery or interactive multi-objective optimization that involves trial and failure. Using currently available approaches, it is generally necessary to modify data preprocessing and model parameters until the result achieves the desired properties.

For at least these reasons, choosing an optimal clustering algorithm for a large data set can be a challenging decision requiring a deep understanding of differences between available clustering methods and of the data set being analyzed. A user (particularly a non-expert user) who wishes to perform a cluster analysis on a data set can easily choose a sub-optimal clustering method, which can result in less the desirable results.

SUMMARY

Various aspects of the current subject matter can advantageously provide approaches for determining an optimal model or algorithm to be used for cluster analysis of data points in a data set. Use of Hilbert curve for indexing the data can allow identification of dominant sets. When greater than a threshold amount of the data points in the data set are within such dominant sets, a centroid model can be identified as a preferred model for cluster analysis. When less than the threshold amount of the data points in the data set are within such dominant sets, a density model can be identified as the preferred cluster analysis model. Automatic selection and execution of the preferred cluster analysis is also within the scope of some implementations of the current subject matter.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Implementations of the current subject matter can include one or more features that can simplify the process of choosing a clustering algorithm and that can automatically choose an optimal clustering algorithm for an end user who does not explicitly choose one.

In some in-main memory database systems, clustering can be performed for point data. For example, a Hilbert curve can be used to index the point data. Hilbert curves (also referred to as Hilbert space-filling curves) are continuous fractal space-filling curves that provide a mapping between 1D and 2D (or 3D) space while reasonably preserving locality information about data points in a data set. A Hilbert curve traverses an area or space in a linear manner, and records for each data point in a data set the distance d from the beginning of the curve to when the curve encounters each data point. Data points having relatively similar values for the distance d can be assumed to be relatively close in the native coordinate system of the data set. For example, if a Cartesian coordinate system is used, two points having similar d values can be assumed to be close to one another in the (X,Y) or (X, Y, Z) Cartesian coordinate system.

Point data indexed using a Hilbert curve manner can be useful in conjunction with an approach consistent with the current subject matter. Indexed point data can be used for bounding the distance between pairs of points. A distance-preserved mapping of points resulting from application of a Hilbert curve can be useful as an input for analysis of existing distance information to search for typical cluster patterns. Identification of cluster patterns in this manner can assist in automated selection of an optimal cluster method for a given data set.

Figure 1:
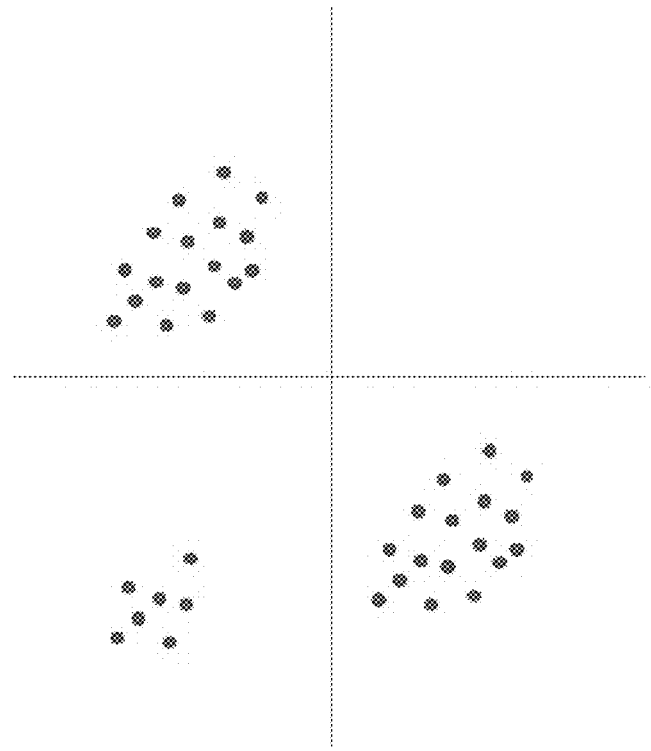
FIG. 1 shows a graph illustrating parts of a data set that are characterized by spherical clustering.

It can be advantageous to choose a centroid model (e.g. a K-means algorithm) for spherical clusters, such as for example the spherical clusters illustrated in the graph 100 of FIG. 1. Typically a centroid model analysis will lead to good results for such clusters. For example, the K-means algorithm is neither very complex nor generally requiring of a long running time. For example, the complexity of a K-means analysis is typically on the order of the product of i (e.g. the number of iterations required to converge to a solution), k (e.g. the number of clusters), and n (e.g. the number of data points). Data points that are highly spherically clustered will typically allow convergence in relatively few iterations (e.g. a low value for i).

Figure 2:
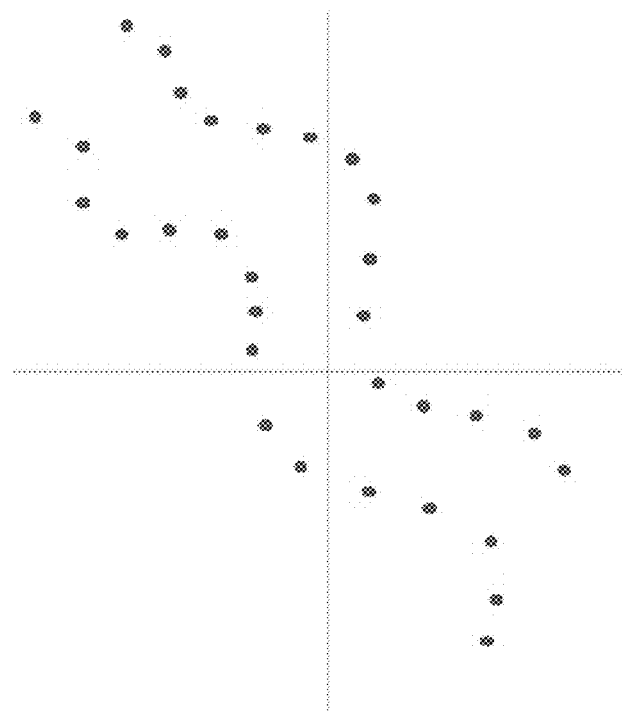
FIG. 2 shows a graph illustrating parts of a data set that are characterized by spherical clustering.

In contrast, for non-spherical clusters, such as for example the representative non-spherical clusters illustrated in the graph 200 of FIG. 2, a centroid model analysis more typically leads most of the time to inappropriate results. However, a density model (e.g. the density-based spatial clustering of applications with noise or DBSCAN algorithm) can have a higher complexity but still be able to handle non-spherical cluster analysis much more optimally die to better noise handling capabilities. For example, a DBSCAN algorithm typically has a complexity on the order of the number n of data points squared in the worst cases and on the order of n times the logarithm of n (e.g. n×log [n]).

Figure 3:
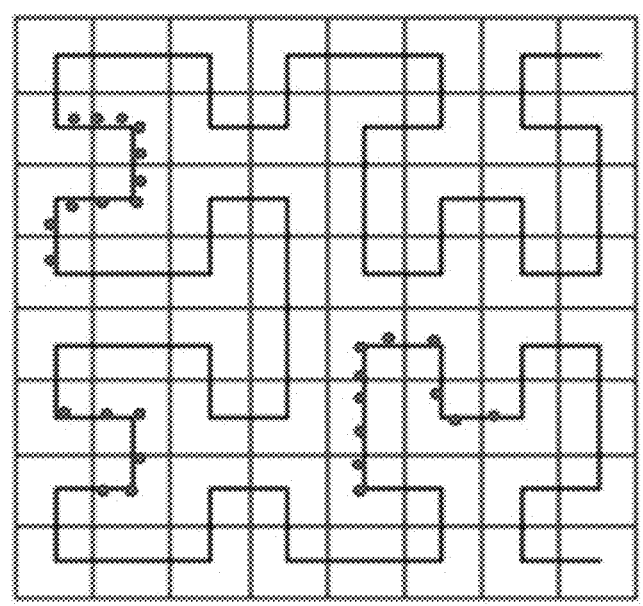
FIG. 3 shows a graph illustrating a Hilbert curve for data points exhibiting spherical clustering.

The distance information derived from Hilbert curve indexing of the data points in the data set (e.g. using an uncompressed Hilbert curve) can be used for detecting whether data points in a data set are predominantly in spherical or non-spherical clusters. If a dominant set of points are occur next to each other on the Hilbert curve, for example as shown in the graph 300 of see FIG. 3, this can be interpreted as a point range which builds a spherical cluster. For example, when more than a threshold amount (e.g. approximately 50%) of the data points in the data set are determined to occur in dominant sets, spherical clustering is assumed to be characteristic of the data points in the data set. A centroid model, such as for example K-means, can be selected as the preferred cluster analysis model under such conditions.

Figure 4:
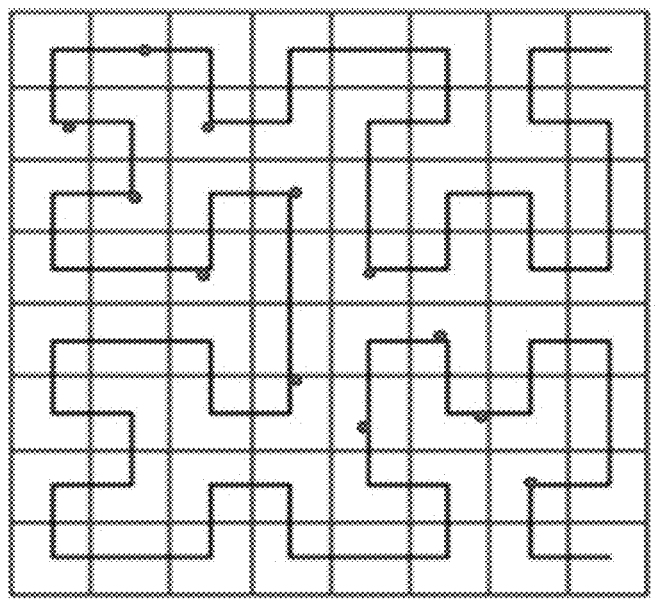
FIG. 4 shows a graph illustrating a Hilbert curve for data points exhibiting non-spherical clustering.

Alternatively, when the threshold amount of data points within dominant sets is not exceeded, for example as shown in the graph 400 of see FIG. 4, non-spherical clustering is assumed to be more characteristic of the data points in the data set. A density model (e.g. DBSCAN) can be selected as the preferred cluster analysis method under such conditions.

A subset of the data points in the data set can be designated as a dominant set when a first overall similarity among data points within the set (e.g. internal data points) is greater than a second overall similarity between points outside of the set (e.g. external data points) and internal data points. Dominant sets can be defined by point ranges of distances along the indexing Hilbert curve. If more than the threshold number of the data points in the data are inside point ranges, the parameter k calculated in this manner can be as a value to initialize the K-means analysis.

The preferred cluster analysis method (e.g. one chosen based on application of one or more approaches consistent with those described herein) can automatically implemented to perform a cluster analysis of the data set. Alternatively, the preferred cluster analysis method can be presented to a user for confirmation that the user wishes to proceed with the cluster analysis using the preferred cluster analysis method. In some implementations of the current subject matter, a SQL syntax such as "CLUSTER BY <column> using auto" can be used to automatically execute the preferred cluster analysis method.

In further implementations of the current subject matter, historical performance metrics can be stored for analyses previously performed using identified preferred cluster analysis method. These historical performance metrics can be used to track the effectiveness of the optimization processes discussion above. Historical performance metrics can include one or more of a timestamp, a total execution time, a number of iterations, a number of ranges, etc. required for each cluster scan. The stored historical performance metrics can be analyzed to automatically adjust the threshold for determining whether the indexed point data should be analysis as spherical clusters or non-spherical clusters, for example under a given set of circumstances (e.g. k<100) that apply to a current analysis.

Figure 5:
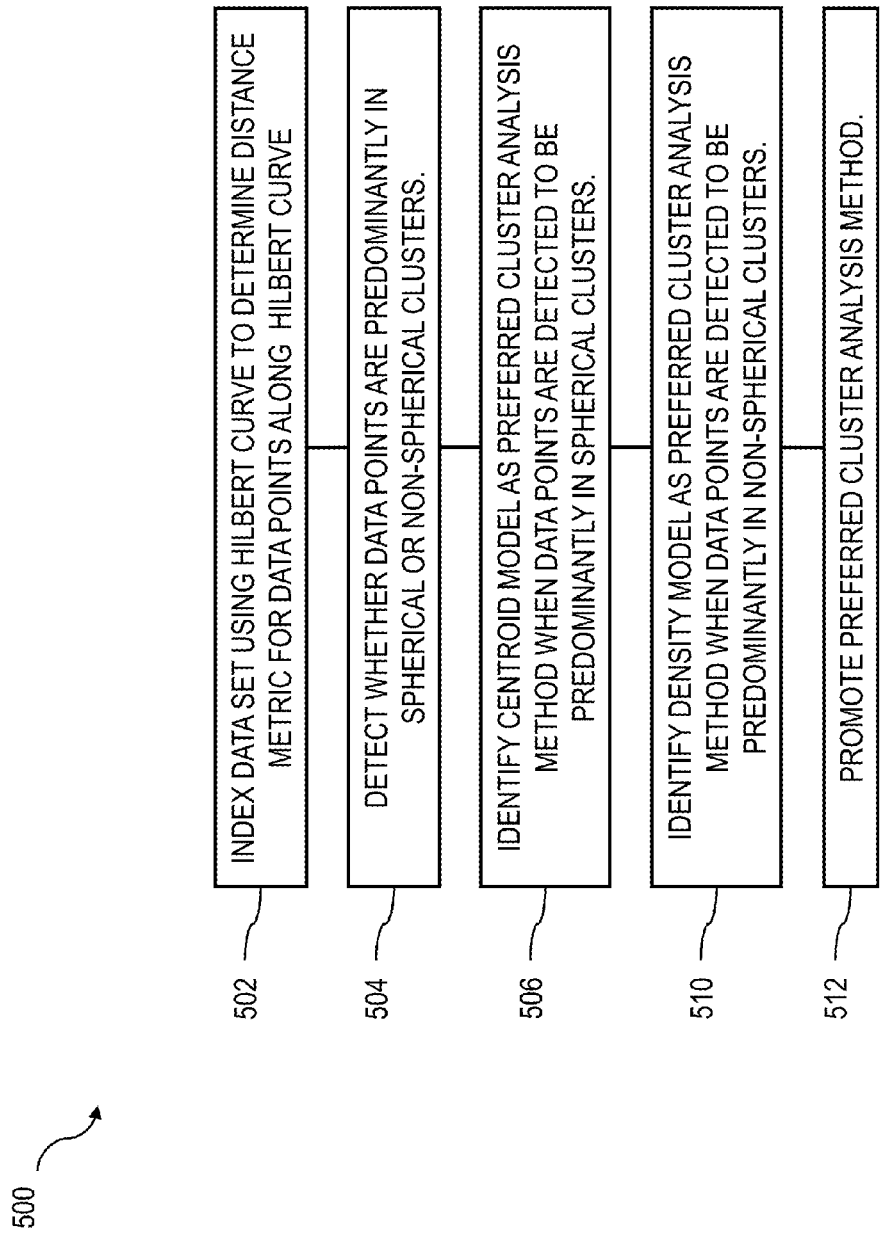
FIG. 5 shows a process flow diagram illustrating aspects of a method having one or more features consistent with implementations of the current subject matter.

FIG. 5 shows a process flow chart 500 illustrating features of a method consistent with implementations of the current subject matter. Depending on the specific implementation, one or more of the method features may be included or omitted. Such a method can be executed by one or more systems that include computer hardware. At 502, a data set is indexed using a Hilbert curve. The data set includes a plurality of data points, and the indexing includes determining a distance metric for each data point along the Hilbert curve.

At 504, it is detected whether the data points are predominantly in spherical or non-spherical clusters. This detecting can advantageously be accomplished by comparing an amount of the data points designated as being in dominant sets based on the indexing to a threshold value. As such, when the amount exceeds the threshold, the data points are detected to be predominantly in spherical clusters, and when the amount does not exceed the threshold, the data points are detected to be predominantly in non-spherical clusters.

Subsets of the data points can be designated as dominant sets such that a first overall similarity among internal members of a subset is higher than a second overall similarity between external data points and the internal data points. The first and second overall similarities can be based on the distances resulting from the indexing.

A centroid model is identified at 506 as a preferred cluster analysis method when the data points are detected to be predominantly in spherical clusters, while a density model is identified at 510 as the preferred cluster analysis method when the data points are detected to be predominantly in non-spherical clusters. A K-means algorithm is a non-limiting example of a centroid model, and a DBSCAN algorithm is a non-limiting example of a density model.

The preferred cluster analysis method is promoted at 512, which can include presenting the preferred cluster analysis method as a suggestion to a user. Alternatively, the promoting can include automatically performing a cluster analysis on the data set using the preferred cluster analysis method.

The approaches discussed above can be seamlessly integrated into any column store system, such as for example an in-main memory high performance database system. As an illustrative, non-limiting example, the following description of an overall architecture, update handling, dictionary coding principles, and memory scan optimizations of such a system is provided with reference to FIG. 6 and FIG. 7.

Figure 6:
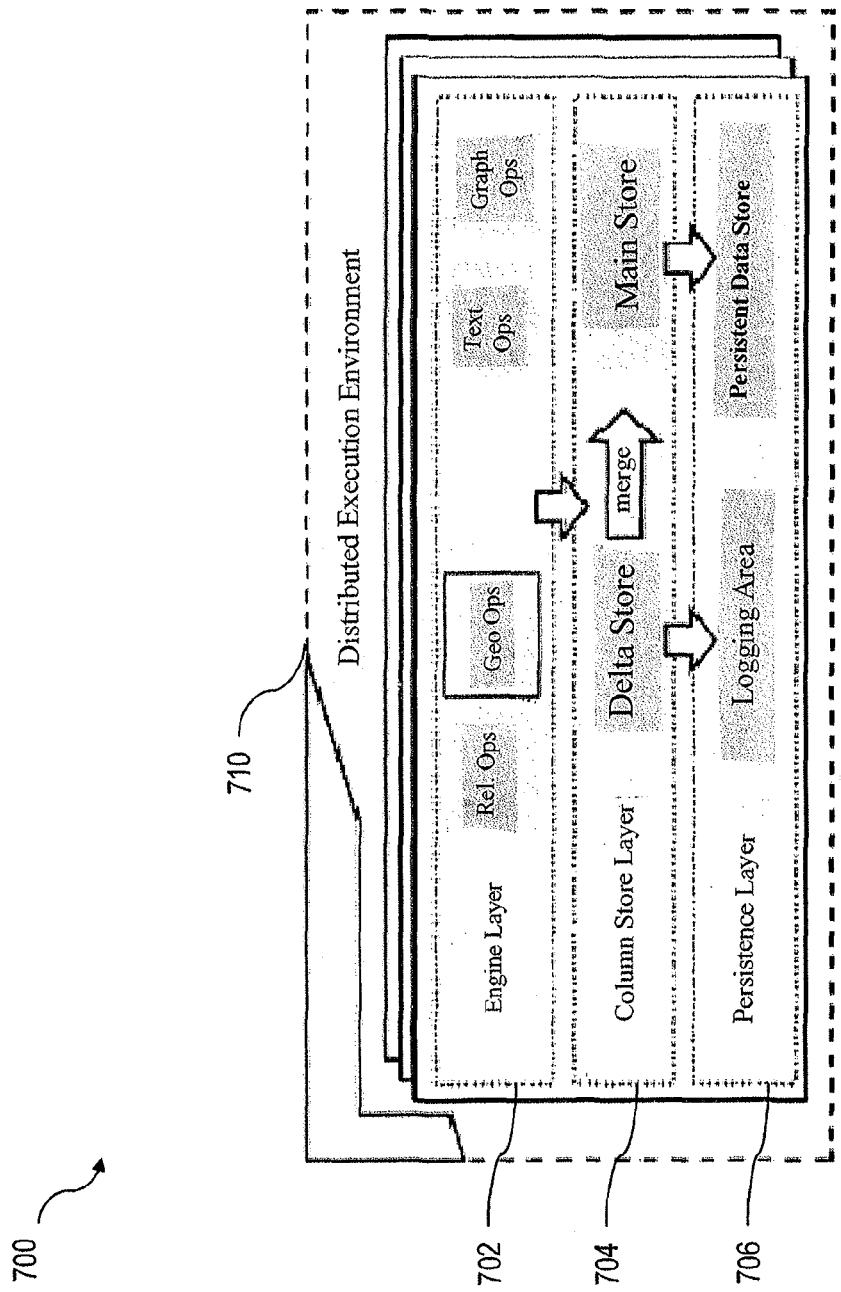
FIG. 6 shows a diagram illustrating a database environment including a column store.
Figure 7:
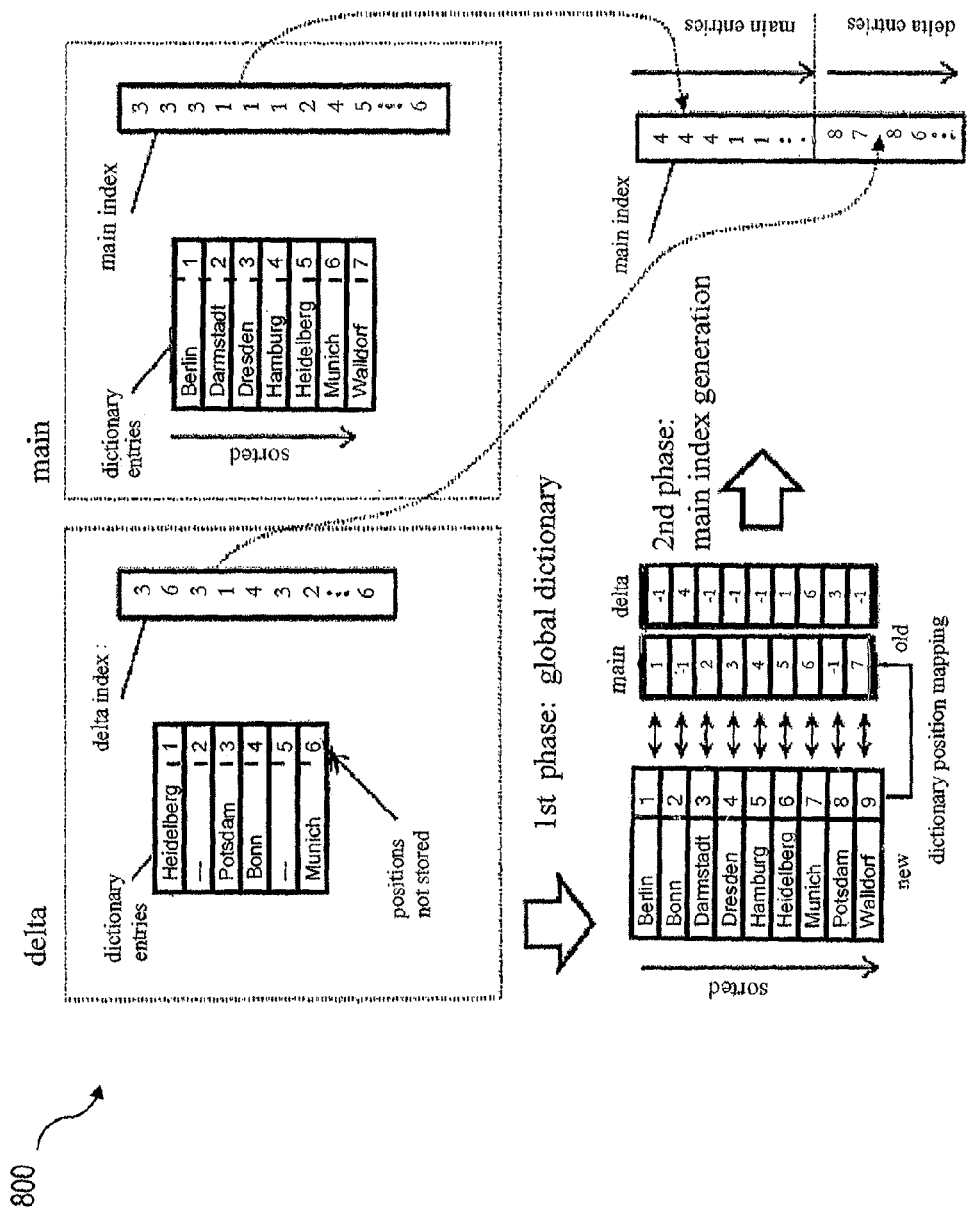
FIG. 7 a diagram illustrating data dictionaries and a corresponding bit compressed vector.

FIG. 6 shows a diagram 100 illustrating a layered architecture of an example of such a system, in which the database distinguishes between compile time and run time of a database request similarly to classical systems. As shown in FIG. 1, the layers can include an engine layer 602, a column store layer 604, and a persistence layer 606. Multiple components, such as a transaction manger, an authorization manager, a meta data (replication) manager, session management, etc., can be clustered around a distributed data flow execution environment 610. Within this environment, different sets of plan operators provide an abstraction from a column-oriented storage model to a corresponding data model. The engine can support a wide range of different set of operators ranging from relational operators (for the core SQL data model) to text or graph processing operators (e.g. for more elaborated and partially domain and vendor-specific data models). The general architectural design decouples the access primitives of the storage system from the different model-specific views on the data. The set of geo operators providing the functionality of geo-aware methods on top of geo-agnostic data structures complements this set of plan operators and automatically takes advantage of all functional and non-functional characteristics of the column store layer.

The column store layer 604 provides a transactionally consistent view to the engine layer 602 following the multi-version concurrency control (MVCC) principle. All operations of a query on top of this layer are transparently embedded into a sphere of control with access only to the correct underlying version of data.

The database also includes a write-optimized delta store and a read-optimized main store. All data modifications are reflected within the delta store, e.g., inserts of new versions of existing entities are represented within the delta. Deletes are either directly reflected in the delta or signaled via an additional bit-vector for the main store. As the delta grows over time, a merge process eventually moves delta entries to the read-optimized main structure. Modifications coming from the user or directly within the system can be encapsulated within the column store layer 604 and transparent for the engine layer 602.

A column store engine can apply dictionary encoding to all columns, independent of their cardinality of number of distinct values. As shown in diagram 700 of FIG. 7, a column then results in two data structures: a dictionary, which maps the user-values to Value IDs, and a bit compressed vector with Value IDs representing the columns of the original table. Due to frequent modifications and its temporary characteristics, the dictionary of the delta is unsorted. The dictionary of the read-optimized main, however, is sorted with respect to the user values. A merge then includes two phases. In a first phase, a new dictionary is constructed, consolidating the entries of the main and delta dictionaries and generating new Value IDs. In a second phase, the main bit compressed vectors are recreated by physically generating a new image of the bit compressed vector that includes the old entries (ignoring deletes) and new entries of the delta. Numerous highly optimized versions of the process exist to speed up the merge process for specific scenarios. Again, the layer above does not notice such internal and asynchronous reorganization steps. This database design can provide a basis for a seamless integration of data-model specific operators relying on core column store data structures. All updates, reorganizations, efficient scan implementations, etc. can be completely transparent for the engine layer 602 and can be exploited via well-defined scan methods. This arrangement allows for easy adoption of the techniques and transfer into other columnar systems.

Figure 8:
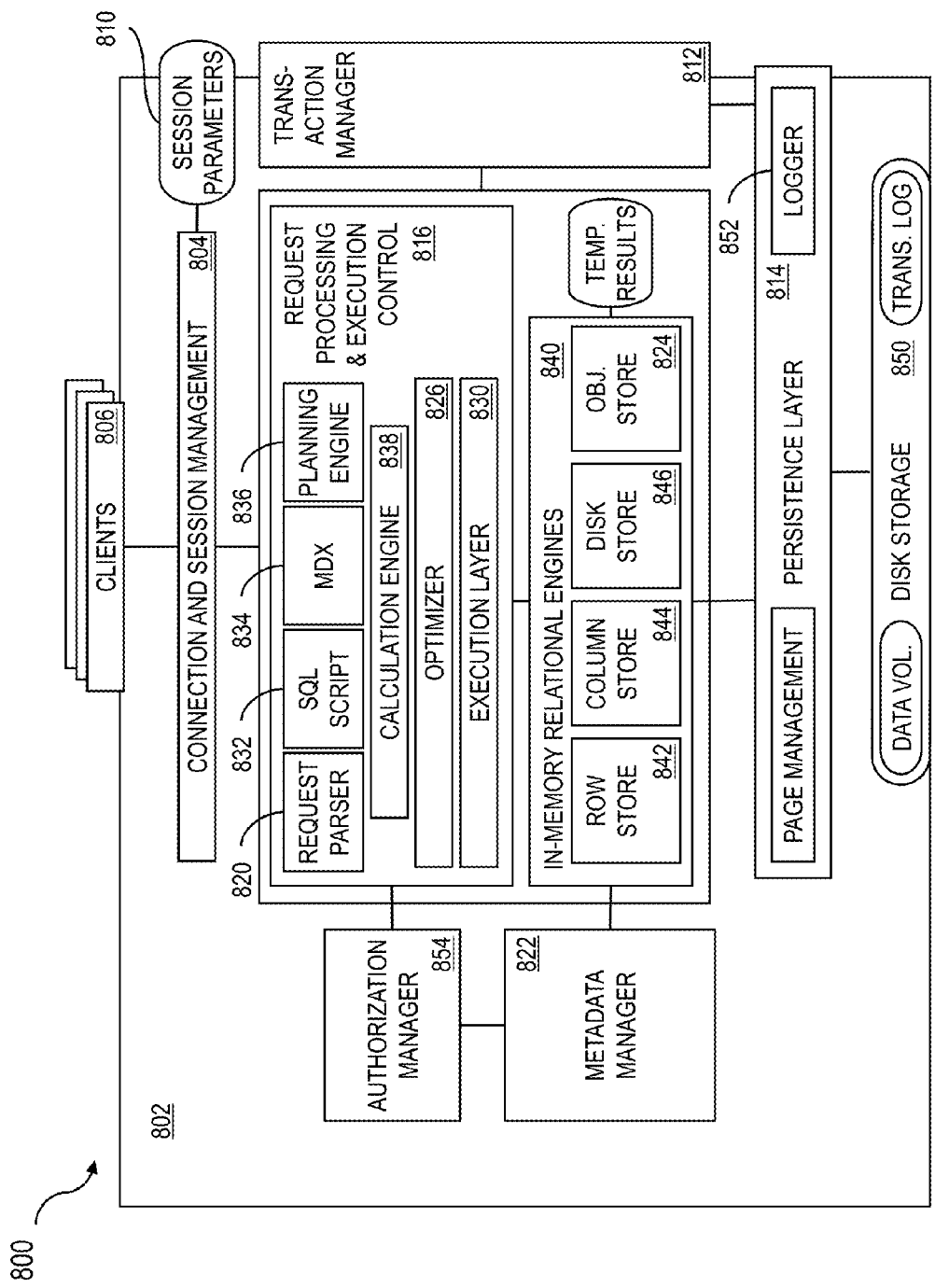
FIG. 8 shows a diagram illustrating aspects of a system showing features consistent with implementations of the current subject matter.

FIG. 8 shows a block diagram of an in-memory relational database server 800 consistent with some implementations of the current subject matter. A connection and session management component 802 of an in-memory database system 804 creates and manages sessions and connections for the database clients 806. For each session a set of parameters 810 is maintained such as for example auto commit settings or the current transaction isolation level. Once a session is established, database clients 806 can use logical (e.g. SQL) statements to communicate with the in-memory database system 804. For analytical applications the multidimensional query language MDX can also be supported.

Each statement can be processed in the context of a transaction. New sessions can be implicitly assigned to a new transaction. A transaction manager 812 can coordinate transactions, control transactional isolation, and keep track of running and closed transactions. When a transaction is committed or rolled back, the transaction manager 812 can inform the involved engines about this event so they can execute necessary actions. The transaction manager 812 can cooperate with a persistence layer to achieve atomic and durable transactions.

Requests received from the database clients 806 can be analyzed and executed by a set of request processing and execution control components 816, which can include a request parser 820 that analyses a request from a database client 806 and dispatches it to a responsible component. Transaction control statements can, for example, be forwarded to the transaction manager 812, data definition statements can be dispatched to a metadata manager 822 and object invocations can be forwarded to an in-memory object store 824. Data manipulation statements can be forwarded to an optimizer 826, which creates an optimized execution plan that is provided to an execution layer 830. The execution layer 830 can act as a controller that invokes the different engines and routes intermediate results to a next phase in execution of the execution plan.

Built-in support can be offered for domain-specific models (such as for financial planning) scripting capabilities that allow to run application-specific calculations inside an in-memory database system. A scripting language, for example SQL Script 832, which is based on side effect free functions that operate on tables using SQL queries for set processing, can be used to enable optimizations and parallelization. The MDX language 834 can be used to provide support for multidimensional queries. A planning engine 836 can allow financial planning applications to execute basic planning operations in the database layer. An example of a basic planning operation is to create a new version of a data set as a copy of an existing one while applying filters and transformations. For example, planning data for a new year can be created as a copy of the data from the previous year. This operation requires filtering by year and updating the time dimension. Another example of a planning operation can be a disaggregation operation that distributes target values from higher to lower aggregation levels based on a distribution function.

Features such as SQL Script 832, MDX 834, and planning engine 836 operations can be implemented using a common infrastructure called a calculation engine 838. Metadata can be accessed via the metadata manager component 822. Metadata can include a variety of objects, such as for example definitions of relational tables, columns, views, indexes, SQL Script functions, object store metadata, and the like. All of these types of metadata can be stored in a common catalog for all stores (in-memory row store, in-memory column store, object store, disk based). Metadata can be stored in tables in row store. In multi-tenant systems and in distributed systems, central metadata can be shared across servers and tenants as discussed in greater detail below. How metadata is stored and shared can be hidden from the components that use the metadata manager 822.

One or more relational engines 840, for example an in-memory row store 842, an in-memory column store 844, a disk-based store 846, and the in-memory object store 824 mentioned above can communicate with the request processing and execution control components 816, the metadata manager 822, and the in-memory persistence layer 814. The row store 842 and column store 844 are each relational in-memory data engines that can store data in a row-based or column-based way, respectively. Some data, such as for example tracing data, need not be kept in memory all the time. The disk-based store 846 can handle such data. Data in the disk-based store 146 can be primarily stored in disk storage 850 and only moved to memory buffers (e.g. the persistence layer 814) when accessed.

When a table is created, the table can be specified in the store in which it is located. Table can be moved to different stores at a time after their creation. Certain SQL extensions can optionally be available only for specific stores (such as for example the "merge" command for a column store). However, standard SQL can be used on all tables. It is also possible to combine tables from different stores in one statement (e.g. using a join, sub query, union, or the like).

As row based tables and columnar tables can be combined in one SQL statement, the corresponding engines must be able to consume intermediate results created by the other. Two engines can differ in the way they process data. Row store operations, for example, can process data in a row-at-a-time fashion using iterators. Column store operations (such as for example scan, aggregate, and so on) can require that the entire column is available in contiguous memory locations. To exchange intermediate results, a row store can provide results to a column store materialized as complete rows in memory while a column store can expose results using the iterator interface needed by a row store.

The persistence layer 814 can be responsible for durability and atomicity of transactions and can ensure that the database is restored to the most recent committed state after a restart and that transactions are either completely executed or completely undone. To achieve this goal in an efficient way, the persistence layer 814 can use a combination of write-ahead logs, shadow paging and save points. The persistence layer 814 can offer interfaces for writing and reading data and can also contain a logger 852 that manages the transaction log. Log entries can be written implicitly by the persistence layer 814 when data are written via a persistence interface or explicitly by using a log interface.

An authorization manager 854 can be invoked by other components of the architecture to check whether a user has the required privileges to execute the requested operations. Privileges can be granted to users or roles. A privilege grants the right to perform a specified operation (such as for example create, update, select, execute, and the like) on a specified object (such as for example a table, view, SQL Script function, and the like). Analytic privileges that represent filters or hierarchy drill down limitations for analytical queries can also be supported. Analytical privileges can grant access to values with a certain combination of dimension attributes. This could for example be used to restrict access to a cube with sales data to values with dimension attributes such as region="US" and year="2010."

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
    indexing a data set using a Hilbert curve, the data set comprising a plurality of data points, the indexing comprising determining a distance metric for each data point along the Hilbert curve;
    detecting whether the data points are predominantly in spherical or non-spherical clusters, the detecting comprising comparing an amount of the data points designated as being in dominant sets based on the indexing to a threshold value, such that when the amount exceeds the threshold, the data points are detected to be predominantly in spherical clusters and when the amount does not exceed the threshold, the data points are detected to be predominantly in non-spherical clusters;
    identifying a centroid model as a preferred cluster analysis method when the data points are detected to be predominantly in spherical clusters and a density model as the preferred cluster analysis method when the data points are detected to be predominantly in non-spherical clusters; and
    promoting the preferred cluster analysis method.

2. The computer program product of claim 1, wherein the density model comprises a DBSCAN algorithm and the centroid model comprises a K-means algorithm.

3. The computer program product of claim 1, wherein the operations further comprise designating subsets of the data points as dominant sets such that a first overall similarity among internal members of a subset is higher than a second overall similarity between external data points and the internal data points.

4. The computer program product of claim 3, wherein the first and second overall similarities are based on the distance metrics resulting from the indexing.

5. The computer program product of claim 1, wherein the promoting comprises at least one of presenting the preferred cluster analysis method as a suggestion to a user and automatically performing a cluster analysis on the data set using the preferred cluster analysis method.

6. A system comprising:
    computer hardware configured to perform operations comprising:
    indexing a data set using a Hilbert curve, the data set comprising a plurality of data points, the indexing comprising determining a distance metric for each data point along the Hilbert curve;
    detecting whether the data points are predominantly in spherical or non-spherical clusters, the detecting comprising comparing an amount of the data points designated as being in dominant sets based on the indexing to a threshold value, such that when the amount exceeds the threshold, the data points are detected to be predominantly in spherical clusters and when the amount does not exceed the threshold, the data points are detected to be predominantly in non-spherical clusters;
    identifying a centroid model as a preferred cluster analysis method when the data points are detected to be predominantly in spherical clusters and a density model as the preferred cluster analysis method when the data points are detected to be predominantly in non-spherical clusters; and
    promoting the preferred cluster analysis method.

7. The system of claim 6, wherein the density model comprises a DBSCAN algorithm and the centroid model comprises a K-means algorithm.

8. The system of claim 6, wherein the operations further comprise designating subsets of the data points as dominant sets such that a first overall similarity among internal members of a subset is higher than a second overall similarity between external data points and the internal data points.

9. The system of claim 8, wherein the first and second overall similarities are based on the distance metrics resulting from the indexing.

10. The system of claim 6, wherein the promoting comprises at least one of presenting the preferred cluster analysis method as a suggestion to a user and automatically performing a cluster analysis on the data set using the preferred cluster analysis method.

11. The system of claim 6, wherein the computer hardware comprises:
- a programmable processor; and
- a machine-readable medium storing instructions that, when executed by the at least one processor, cause the at least one programmable processor to perform at least some of the operations.

12. A computer-implemented method comprising:
- indexing a data set using a Hilbert curve, the data set comprising a plurality of data points, the indexing comprising determining a distance metric for each data point along the Hilbert curve;
- detecting whether the data points are predominantly in spherical or non-spherical clusters, the detecting comprising comparing an amount of the data points designated as being in dominant sets based on the indexing to a threshold value, such that when the amount exceeds the threshold, the data points are detected to be predominantly in spherical clusters and when the amount does not exceed the threshold, the data points are detected to be predominantly in non-spherical clusters;
- identifying a centroid model as a preferred cluster analysis method when the data points are detected to be predominantly in spherical clusters and a density model as the preferred cluster analysis method when the data points are detected to be predominantly in non-spherical clusters; and
- promoting the preferred cluster analysis method,
- wherein the indexing, the detecting, the identifying, and the promoting is performed by at least one system comprising computer hardware.

13. The computer-implemented method of claim 12, wherein the density model comprises a DBSCAN algorithm and the centroid model comprises a K-means algorithm.

14. The computer-implemented method of claim 12, further comprising designating subsets of the data points as dominant sets such that a first overall similarity among internal members of a subset is higher than a second overall similarity between external data points and the internal data points.

15. The computer-implemented method of claim 14, wherein the first and second overall similarities are based on the distance metrics resulting from the indexing.

16. The computer-implemented method of claim 12, wherein the promoting comprises at least one of presenting the preferred cluster analysis method as a suggestion to a user and automatically performing a cluster analysis on the data set using the preferred cluster analysis method.

* * * * *